United States Patent [19]

Brand

[11] Patent Number: 4,515,022

[45] Date of Patent: May 7, 1985

[54] FLOW MONITORING METHOD AND DEVICE

[76] Inventor: Glen Brand, 4114 N. 79th, Omaha, Nebr. 68134

[21] Appl. No.: 502,917

[22] Filed: Jun. 10, 1983

[51] Int. Cl.³ ............................................. G01F 1/10
[52] U.S. Cl. ................................................. 73/861.79
[58] Field of Search ........... 73/861.79, 861.83, 861.77, 73/861.78

[56] References Cited

U.S. PATENT DOCUMENTS

| | | | |
|---|---|---|---|
| 1,463,174 | 7/1923 | Paterson et al. | 73/861.79 |
| 1,904,283 | 4/1933 | Fagan et al. | 73/861.79 |
| 3,136,159 | 6/1964 | Young | 73/861.83 |
| 3,377,856 | 4/1968 | Hasegawa | 73/199 |
| 3,453,538 | 7/1969 | Wright et al. | 73/861.77 |
| 3,788,142 | 1/1974 | Goransson | 73/861.83 |
| 3,811,323 | 5/1974 | Swenson | 73/231 R |
| 4,041,891 | 8/1977 | Rosaen | 116/117 R |
| 4,186,603 | 2/1980 | Du Bae | 73/231 R |
| 4,282,883 | 8/1981 | Yerushalmy | 73/861.77 |
| 4,428,243 | 1/1984 | Taylor | 73/861.77 |

FOREIGN PATENT DOCUMENTS 53772  1/1943  Netherlands ..................... 73/861.79

*Primary Examiner*—Tim Miles
*Attorney, Agent, or Firm*—Henderson & Sturm

[57] ABSTRACT

A device installed in the reservoir drain line of a hydraulic pump or motor provides for the visual observation of an internally housed turbine whose rotations may be counted and, after comparing with elapsed time, used to determine, first, its revolutions per minutes and, then, by referring to a conversion chart, the fluid velocity of oil loss to the reservoir. If the loss to reservoir is greater than a known acceptable standard, the pump or motor may be repaired, overhauled or replaced.

11 Claims, 4 Drawing Figures

FLOW MONITORING METHOD AND DEVICE

TECHNICAL FIELD

This invention relates generally to methods and devices for monitoring the rate of flow of oil from a hydraulic pump or motor and more particularly to the provision of a device which is practical to permanently install in conjunction with a pump or motor and which may be easily monitored by unskilled personnel.

BACKGROUND ART

Normally a hydraulic pump or motor returns about one-half to one gallon of oil per minute to the reservoir while in operation, which flow is referred to as the case drain flow. This normal operating loss of oil serves two purposes. The first is that of lubricating the moving parts of the pump or motor, there being no need for a separate source of lubrication for such a device when its own hydraulic oil is readily available. The second purpose is to serve as a heat exchange medium for removing excess heat from the pump or motor.

As the pump or motor is used and its parts gradually wear, the amount of such oil being lost gradually increases. Under normal operating conditions and without traumatic injury to the pump or motor an amount of wear will eventually occur which, if remedial steps are not taken, will eventually result in either inefficient operation or severe damage to the unit. Also in a complex hydraulic system, where many devices operate in conjunction with one or more motors and/or pumps, it is not always possible to know whether the source of trouble is in a motor or pump or one of the other various devices operating in the system.

When a problem persists in a hydraulic system, it is common to measure case drain flow across its various motors and pumps. Excessive flow would indicate that oil losses of a magnitude greater than one gallon per minute, or whatever is allowable, are occurring across the particular pump or motor, further indicating the need to repair or replace the unit.

The conventional method of measuring such an oil flow is to install an expensive flow test kit between the unit and the reservoir. In addition to the relatively complex test kit, other tools and specialized knowlege are required to install and monitor the unit. Oil flow is measured both at zero pressure and at normal operating pressure, from which measurements oil loss can be determined. Only in rare situations is it practical to permanently install such testing equipment in conjunction with a pump or motor. Due to the high cost of the oil test kit, its temporary installation, and the need for experienced personnel to take the readings, more often than not, the same is not accomplished until wear and/or damage to the pump or motor has progressed to a point calling for complete overhaul or replacement of the unit.

DISCLOSURE OF THE INVENTION

An object of the present invention is the provision of an improved method and device for monitoring changes in hydraulic oil flow rates.

Another object is to provide a monitoring device which is simple enough in construction and cost of manufacture to warrant permanent installation in conjunction with a hydraulic motor or pump.

A further object of the invention is the provision of a fluid monitoring device which can be operated by unskilled persons on a daily or periodic basis.

Still another object is the provision of a method and device for monitoring flow in a hydraulic oil line which detects trouble in a pump and/or motor at an early stage.

According to the present invention the foregoing and other objects are attained by installing in conjunction with a hydraulic pump or motor a device installed within the reservoir return line which provides for the visual observation of a turbine supported therewithin in such a manner that its rotational velocity will be proportionate to the fluid velocity, to time the revolutions of the turbine, to determine the number of gallons per minute returning to reservoir by referring to a conversion chart, and then to compare the number of gallons per minute with an acceptable standard. The monitoring device is comprised of a transparent housing installed within the return reservoir line of a hydraulic pump or motor, an axle support member affixed within the housing near its outlet end, an axle supported thereby at its downstream end coaxial with the housing, a turbine having a hollow core which is open on its downstream end for rotational bearing upon the axle, a cylindrical structure supported by the turbine vanes coaxial with the housing and having thereon an indicator mark, and a conversion chart for reading gallons per minute from periodic determinations of revolutions per minute.

Other objects, advantages and novel features of the present invention will become apparent from the following detailed description of the invention when considered in conjunction with the accompanying drawings.

BEST MODE FOR CARRYING OUT THE INVENTION

Figure 1:
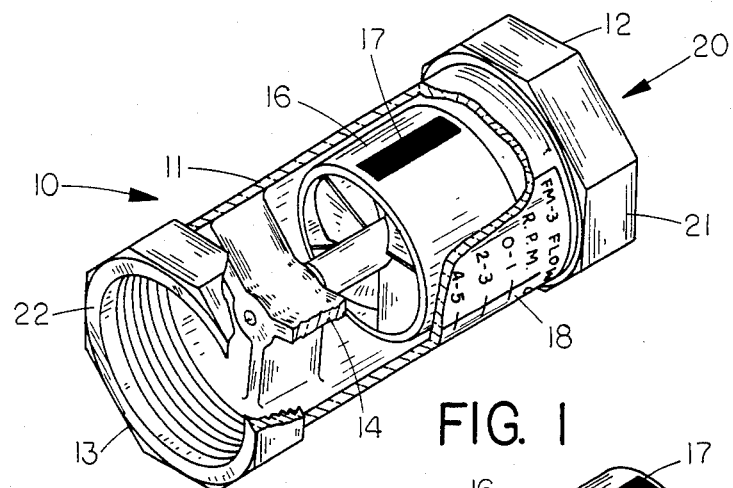
FIG. 1 is a perspective view of the flow monitoring device with a portion of its housing broken away to expose its interior.
Figure 2:
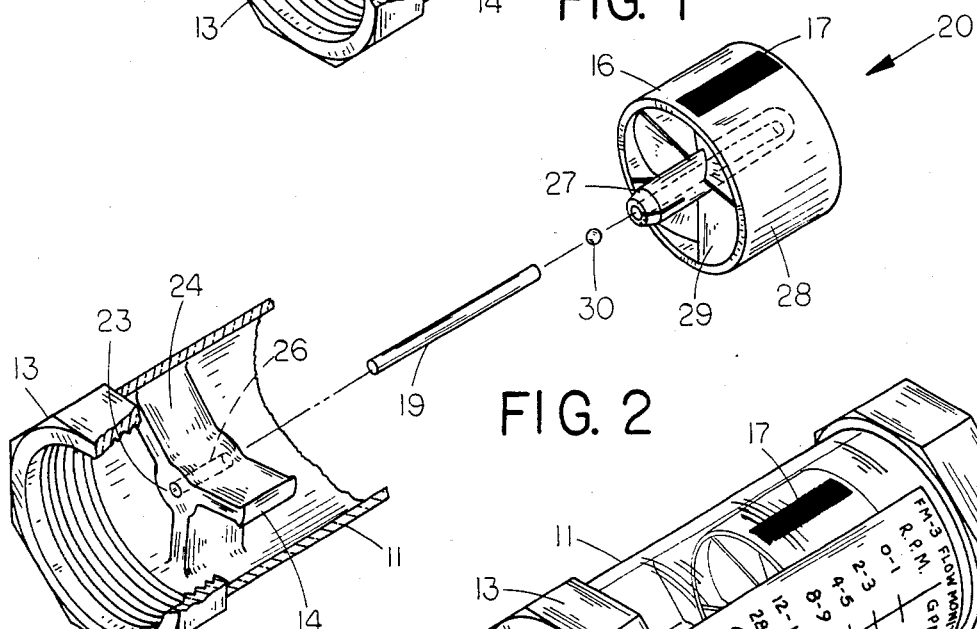
FIG. 2 is an exploded perspective view of a portion of the housing, the axle, and the turbine of the flow monitoring device.

Referring now to the drawings wherein like numerals designate identical and corresponding parts throughout the several views, and more particularly to FIG. 1 wherein the flow monitoring device is depicted generally at 10, the key elements visible thereon are a cylindrical housing (11) having an inlet end (12) and and outlet end (13), an axle support member (14), a turbine (16) having an indicator mark (17) and conversion chart (18). Referring now to FIG. 2, rounded axle (19) can be seen in its positional relationship to support member (14) and turbine (16). The direction of flow of a fluid through monitoring device (10) is depicted by arrow (20).

In this embodiment, housing (11), which is installed in the drain line running from a hydraulic pump or motor to the reservoir, is made of a transparent material such as plastic. However, it is only essential that a portion of housing (11) be transparent such that indicator mark

(17) can readily be observed as it revolves by the transparent portion or window. Also, in this embodiment inlet end (12) and outlet end (13) are both internally threaded for a short distance near either opening of housing (11). Annular flanges (21) and (22) are hexogonal in shape, thus providing a ready means for using a wrench to install the flow monitoring device (10) within an oil conduit leading from a hydraulic pump or motor to the reservoir.

Axle support member (14) is comprised of a central core (23) (best seen in FIG. 2) which is supported coaxially within housing (11) by three radial arms (24) which are equally spaced thereabout. Axle support member (14) is affixed within housing (11) near outlet end (13) and, coaxial with its core (23) and housing (11), is axle receiving recess (26). Axle receiving recess (26) is distal outlet end (13), and is approximately equal in diameter to axle (19) for a force fit therewithin.

Turbine (16) is comprised of a torpedo-shaped hollow core (27), a surrounding cylindrical structure (28) (best seen in FIG. 2) and a plurality of fan-shaped vanes (29) which radiate from core (27) to fixedly support cylinder (28) coaxially therewith. Vanes (29) are canted with respect to a plane perpendicular to the axis of turbine (16), in a conventional manner for turbines, in order to cause turbine (16) to rotate when a fluid passes through housing (11) in the direction of arrow (20). The rotational speed of turbine (16) will be relative or proportional to the fluid velocity.

Figure 4:
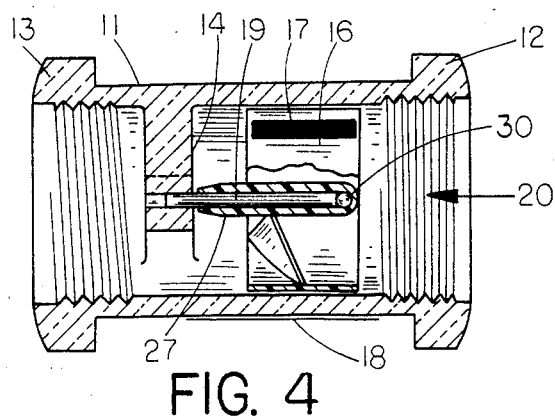
FIG. 4 is a cross-sectional view of the flow monitoring device in its assembled form.

Referring now to FIG. 4, wherein the operating relationships between axle support element (14), axle (19) and turbine (16) can be seen, the length of axle (19) is best understood. The length of axle (19) is such that there will be no contact between the downstream end of core (27) and axle support member (14), and turbine (16) will be held against the end of axle (19) and thrust ball bearing (30) by fluid pressure as the hollow portion of core (27) bears against the thrust ball bearing (30) and hence the upstream end and lengthwise surface of axle (19). The torpedo-shape of core (27) will offer the least resistance to fluid flow in the direction of arrow (20).

Figure 3:
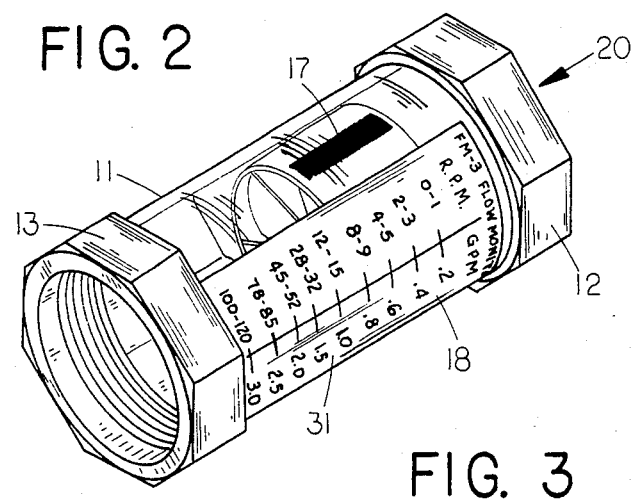
FIG. 3 is a perspective view of the flow monitoring device in its assembled form.

Referring now to FIG. 3, conversion chart (18) is seen to be comprised of two columns of figures, one under the heading R.P.M. (revolutions per minute) and the other under the heading G.P.M. (gallons per minute). In this embodiment, which was developed to operate with typical hydraulic oil, the R.P.M. figures range from 0–1 to 100–120 and the G.P.M. figures range from 0.2 to 3.0. Although it may be located elsewhere, in this embodiment conversion chart (18) is printed upon opaque background (31) on the outer surface of housing (11). Opaque background (31) has at least one straight side which is parallel with the axis of housing (11) and serves as a visual start and stop point for counting revolutions of indicator mark (17).

To monitor the quantity per unit time of a fluid travelling through housing (11) in the direction of arrow (20), and, thus, determine if an inordinate quantity of fluid is travelling from a pump or motor to a reservoir, it is only necessary to count the number of times indicator mark (17) passes by the straight side of opaque background (31) of conversion chart (18) in one minute. Of course, if turbine (16) does not make a full revolution in one minute, the number of minutes required for one full revolution may be determined and then divided into one. Although a timing mechanism of some sort is required to determine R.P.M. with flow monitoring device (10), it is not described as a part of the mechanism because monitoring device (10) serves primarily as a monitor and not a metering device. The utility of the device resides in its presence as a means of visually detecting unusual or undesirable levels of fluid flow.

Thus, an inexpensive, simple and trouble-free monitor is provided which may be permanently installed in conjunction with any hydraulic pump or motor and then periodically be read with sufficient accuracy for early detection of near term pending trouble.

Obviously numerous modifications and variations of the present invention are possible in light of the above teachings. It is therefore to be understood that within the scope of the appended claims, the invention may be practised otherwise than as specifically described.

I claim:

1. A flow monitoring device in combination with a hydraulic pump or motor, comprising:
 a housing having an inlet end, an outlet end and a transparent wall portion;
 means for supporting an axle within said housing;
 an axle affixed at one end to the supporting means and located centrally and longitudinally with respect to the two ends of the housing; and
 a turbine mounted for rotation about said axle, having a mark thereupon visible through the transparent wall portion of the housing.

2. The flow monitoring device of claim 1 further comprising an R.P.M. to G.P.M. conversion chart affixed to the outside of said housing.

3. The flow monitoring device of claim 1 wherein the inlet end and the outlet end of the housing are cylindrical and threaded inside for cooperative connection with threaded pipe fittings.

4. The flow monitoring device of claim 3 wherein the housing is cylindrical and coaxial with the axle and the cylindrical ends.

5. The flow monitoring device of claim 1 wherein the axle supporting means is located downstream from the axle and the turbine includes a hollow core which is closed on its upstream end and which bears for rotational movement upon a ball bearing that contacts said axle.

6. The flow monitoring device of claim 2 wherein the axle supporting means is located downstream from the axle and the turbine includes a hollow core which is closed on its upstream end and which bears for rotational movement upon a ball bearing that contacts said axle.

7. The flow monitoring device of claim 3 wherein the axle supporting means is located downstream from the axle and the turbine includes a hollow core which is closed on its upstream end and which bears for rotational movement upon a ball bearing that contacts said axle.

8. The flow monitoring device of claim 4 wherein the axle supporting means is located downstream from the axle and the turbine includes a hollow core which is closed on its upstream end and which bears for rotational movement upon a ball bearing that contacts said axle.

9. The flow monitoring device of claim 4 wherein the turbine includes a plurality of radial vanes which support a cylinder coaxial with the turbine core, upon which the mark is located.

10. A method of monitoring the quantity of oil flowing from a hydraulic pump or motor to a reservoir, comprising the steps of:

observing a means for indicating the relative velocity of oil passing from the pump or motor to the reservoir;

relating the relative velocity of oil observed to a unit of time;

reading from a chart, for converting the relative velocity of oil per unit of time to the quantity of oil per minute passing to reservoir; and comparing the quantity so determined to a known acceptable level.

11. The method of claim 10 wherein said velocity indicating means is a device comprising:

a housing having an inlet end, an outlet end and a transparent wall portion;

means for supporting an axle within said housing;

an axle affixed at one end to the supporting means and located centrally and longitudinally with respect to the two ends of the housing; and a turbine mounted for rotation about said axle, having a mark thereupon visible through the transparent wall portion of the housing.

* * * * *